United States Patent
Emami et al.

(10) Patent No.: US 10,915,405 B2
(45) Date of Patent: Feb. 9, 2021

(54) METHODS FOR HANDLING STORAGE ELEMENT FAILURES TO REDUCE STORAGE DEVICE FAILURE RATES AND DEVICES THEREOF

(71) Applicant: NetApp, Inc., Sunnyvale, CA (US)

(72) Inventors: Tim K. Emami, San Jose, CA (US); Charles Binford, Wichita, KS (US); Ratnesh Gupta, Alameda, CA (US)

(73) Assignee: NETAPP, INC., Sunnyvale, CA (US)

( * ) Notice: Subject to any disclaimer, the term of this patent is extended or adjusted under 35 U.S.C. 154(b) by 268 days.

(21) Appl. No.: 15/606,379

(22) Filed: May 26, 2017

(65) Prior Publication Data

US 2018/0341554 A1 Nov. 29, 2018

(51) Int. Cl.
*G06F 11/14* (2006.01)
*G06F 11/10* (2006.01)
(Continued)

(52) U.S. Cl.
CPC ........ *G06F 11/1446* (2013.01); *G06F 11/108* (2013.01); *G06F 11/1092* (2013.01);
(Continued)

(58) Field of Classification Search
CPC .. G06F 3/0689; G06F 3/0619; G06F 11/1092; G06F 3/065; G06F 2211/1057;
(Continued)

(56) References Cited

U.S. PATENT DOCUMENTS 5,835,694 A * 11/1998 Hodges ............... G06F 11/1076
714/6.21
8,719,520 B1 * 5/2014 Piszczek ............. G06F 11/1076
709/219

(Continued)

OTHER PUBLICATIONS

"Understanding Flash_Blocks, Pages and Program_Erases_ flashdba", Jun. 20, 2014, https://flashdba.com/2014/06/20/understanding-flash-blocks-pages-and-program-erases/.*
(Continued)

*Primary Examiner* — Khoa D Doan
(74) *Attorney, Agent, or Firm* — Troutman Pepper Hamilton Sanders LLP (Rochester)

(57) ABSTRACT

Methods, non-transitory computer readable media, and computing devices that determine when a storage element of a data storage device has failed. Address(es) mapped to the failed storage element are identified, when the determining indicates that the storage element has failed. Data corresponding to the address(es) is regenerated according to a data loss protection and recovery scheme (e.g., a RAID scheme). The regenerated data is written to other storage element(s) of the data storage device in order to remap the address(es) to the other storage element(s). This technology allows a data storage device (e.g., an SSD) to be repaired in-place following a failure of storage element(s) (e.g., a die) of the data storage device. Advantageously, entire data storage devices do not have to be failed with this technology as a result of a failure of an individual storage element, thereby reducing data storage device failure rates and associated overhead.

18 Claims, 5 Drawing Sheets

(51) Int. Cl.
*G06F 11/16* (2006.01)
*G06F 11/30* (2006.01)

(52) U.S. Cl.
CPC .............. *G06F 11/14* (2013.01); *G06F 11/16* (2013.01); *G06F 11/1666* (2013.01); *G06F 11/3034* (2013.01)

(58) Field of Classification Search
CPC ......... G06F 2212/6022; G06F 11/0709; G06F 12/0246; G06F 11/2094; G06F 3/1234; G06F 11/108; G06F 11/1008; G06F 11/142; G06F 2212/2022; G06F 11/08; G06F 2212/1016; G06F 11/1076–1096; G06F 12/2046; G06F 3/067; G06F 11/109
See application file for complete search history.

(56) References Cited

U.S. PATENT DOCUMENTS

| | | | | |
|---|---|---|---|---|
| 9,286,002 | B1* | 3/2016 | Karamcheti | G06F 3/0647 |
| 9,569,306 | B1* | 2/2017 | Camp | G06F 11/108 |
| 9,804,939 | B1* | 10/2017 | Bono | G06F 11/2094 |
| 10,133,638 | B1* | 11/2018 | Sakdeo | G06F 16/11 |
| 10,620,879 | B2* | 4/2020 | Chang | G06F 3/0679 |
| 2006/0098489 | A1* | 5/2006 | Inoue | G11C 16/349 365/185.19 |
| 2007/0266205 | A1* | 11/2007 | Bevilacqua | G06F 3/0605 711/114 |
| 2008/0256292 | A1* | 10/2008 | Flynn | G06F 3/0613 711/114 |
| 2014/0189421 | A1* | 7/2014 | Werner | G06F 11/2056 714/6.21 |
| 2014/0325262 | A1* | 10/2014 | Cooper | G06F 11/108 714/6.22 |
| 2015/0205668 | A1* | 7/2015 | Sundaram | G06F 11/1076 714/6.24 |
| 2016/0224423 | A1* | 8/2016 | Grube | G06F 11/1076 |
| 2017/0294237 | A1* | 10/2017 | Li | G11C 29/76 |

OTHER PUBLICATIONS

E. Gal and S. Toledo, "Mapping structures for flash memories: techniques and open problems," IEEE International Conference on Software—Science, Technology & Engineering (SwSTE'05), Herzlia, Israel, 2005, pp. 83-92, doi: 10.1109/swste.2005.14. (Year: 2005).*
J. Cao, S. Wang, D. Dai, M. Zheng and Y. Chen, "A Generic Framework for Testing Parallel File Systems," 2016 1st Joint International Workshop on Parallel Data Storage and data Intensive Scalable Computing Systems (PDSW-DISCS), Salt Lake City, UT, 2016, pp. 49-54, doi: 10.1109/pdsw-discs.2016.013. (Year: 2016).*

* cited by examiner

//METHODS FOR HANDLING STORAGE ELEMENT FAILURES TO REDUCE STORAGE DEVICE FAILURE RATES AND DEVICES THEREOF

FIELD

This technology relates to failure handling for storage devices.

BACKGROUND

Individuals and organizations devote an increasing amount of resources in order to meet continually expanding data storage needs. While many different types of data storage products are available, solid state drives (SSDs) (e.g., flash memory devices) are often used for persistently storing data for which relatively low access time and latency may be required. SSDs generally utilize integrated circuits (ICs) as memory in order to store data. The ICs are produced on wafers that are split or diced into storage elements referred to as dice or die, or NAND dice. Accordingly, an SSD may be assembled from a number of individual dice each having a storage capacity based on IC density.

Each die in an SSD is susceptible to failure and generally has an associated mean time between failures (MTBF). As SSDs are relatively expensive, and storage systems currently fail entire SSDs in response to individual die failures, storage hosts incur significant replacement costs in order to maintain a particular level of SSD storage. Additionally, while storage systems have redundancy protection to mitigate data loss, recovering from a failure of an SSD requires significant overhead and associated degraded host performance, which is undesirable.

DETAILED DESCRIPTION

Figure 1:
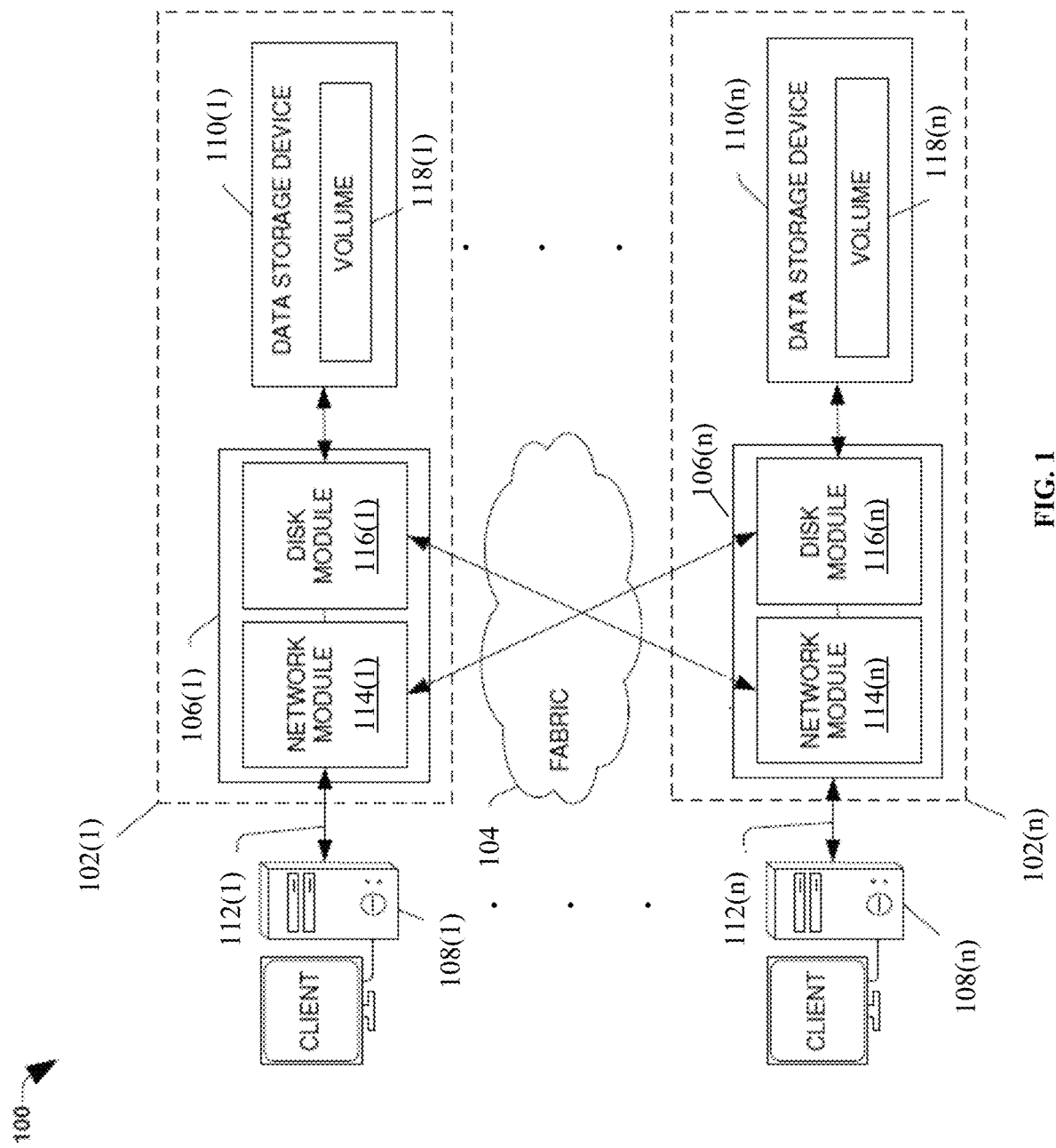
FIG. 1 is a block diagram of a network environment with exemplary data storage apparatuses each including a node computing device.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components, etc. therein, such as, node computing devices 106(1)-106(n), for example), although any number of other elements or components can also be included in the clustered network environment 100 in other examples. This technology provides a number of advantages including methods, non-transitory computer readable media, and devices that allow data storage devices to be repaired in-place, without being failed by a host, following a failure of particular storage element(s), thereby reducing data storage device failure rates.

In this example, node computing devices 106(1)-106(n) can be primary or local storage controllers or secondary or remote storage controllers that provide client devices 108(1)-108(n), with access to data stored within data storage devices 110(1)-110(n). The data storage apparatuses 102(1)-102(n) and/or node computing device 106(1)-106(n) of the examples described and illustrated herein are not limited to any particular geographic areas and can be clustered locally and/or remotely. Thus, in one example the data storage apparatuses 102(1)-102(n) and/or node computing device 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices used for storage (e.g., storage servers), and other computers or peripheral devices, are coupled to the respective data storage apparatuses 102(1)-102(n) by storage network connections 112(1)-112(n). Network connections 112(1)-112(n) may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the client devices 108(1)-108(n) may be general-purpose computers running applications, and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage control configured to process I/O commands issued by the client devices 108(1)-108(n)), and the data storage apparatuses 102(1)-102(n) may return results of the request to the client devices 108(1)-108(n) via the storage network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such a node computing device 106(1)-106(n) can be a device attached to the fabric 104 as a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing device 106(1) may be located on a first storage site and the node computing device 106(n) may be located at a second storage site. The node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1)

provides client device 112(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(2), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks through the operating system, rather than expressly requesting abstract files.

While the clustered network environment 100 illustrates an equal number of network modules 114(1)-114(2) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data (D) and/or parity (P) information.

The aggregates include volumes 118(1)-118(n) in this example, although any number of volumes can be included in the aggregates. The volumes 118(1)-118(n) are virtual data stores that define an arrangement of storage and one or more file systems within the clustered network environment 100. Volumes 118(1)-118(n) can span a portion of a disk or other storage device, a collection of disks, or portions of disks, for example, and typically define an overall logical arrangement of file storage. In one example volumes 118(1)-118(n) can include stored data as one or more files or objects that reside in a hierarchical directory structure within the volumes 118(1)-118(n). Volumes 118(1)-118(n) are typically configured in formats that may be associated with particular storage systems, and respective volume formats typically comprise features that provide functionality to the volumes 118(1)-118(n), such as providing an ability for volumes 118(1)-118(n) to form clusters.

In one example, to facilitate access to data stored on the disks or other structures of the data storage device 110(1)-110(n), a file system (e.g., write anywhere file system) may be implemented that logically organizes the information as a hierarchical structure of directories and files. In this example, respective files may be implemented as a set of disk blocks configured to store information, whereas directories may be implemented as specially formatted files in which information about other files and directories are stored.

Data can be stored as files or objects within a physical volume and/or a virtual volume, which can be associated with respective volume identifiers, such as file system identifiers (FSIDs). The physical volumes correspond to at least a portion of physical storage devices, such as the data storage device 110(1)-110(n) (e.g., a Redundant Array of Independent (or Inexpensive) Disks (RAID system)) whose address, addressable space, location, etc. does not change. Typically the location of the physical volumes does not change in that the (range of) address(es) used to access it generally remains constant.

Virtual volumes, in contrast, are stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, and/or files. Among other things, these features, but more particularly the LUNS, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

In one example, respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
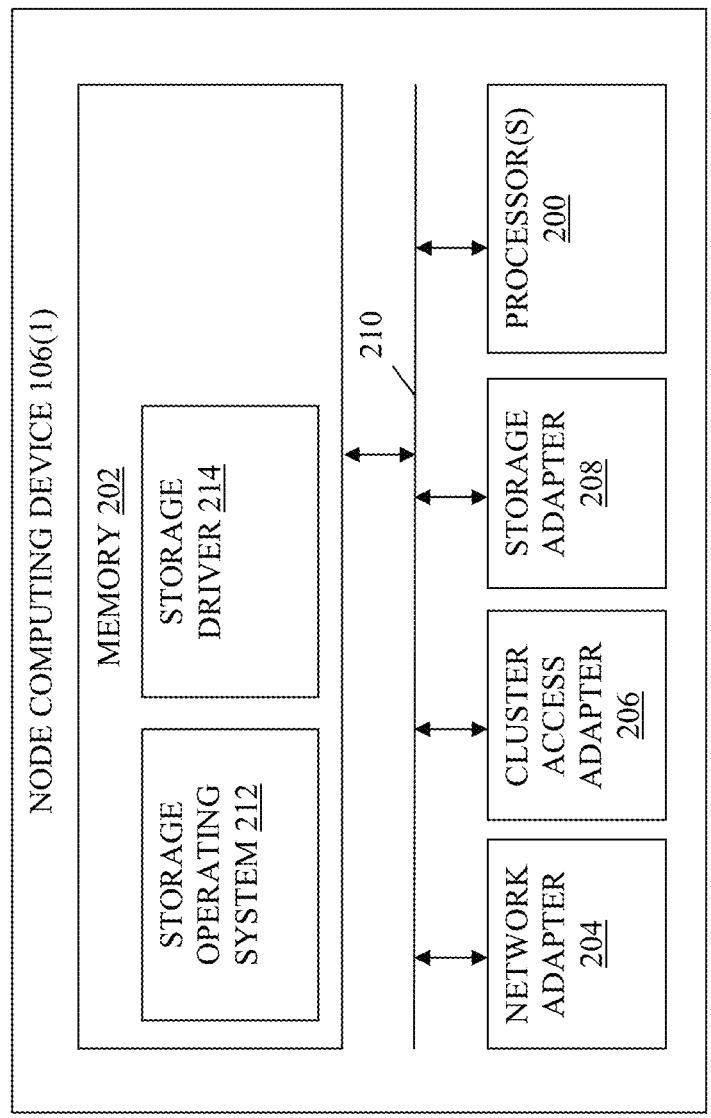
FIG. 2 is a block diagram of an exemplary one of the node computing devices shown in FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a Redundant Array of Independent (or Inexpensive) Disks (RAID) data loss protection and recovery scheme to optimize a reconstruction process of data of a failed disk or drive in an array. In some examples, the node computing device 106(n) is substantially the same in structure and/or operation as node computing device 106(1), although the node computing device 106(n) can include a different structure and/or operation in one or more aspects than the node computing device 106(1) in other examples.

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The storage operating system 212 can also establish one or more file systems including software code and data structures that implement a persistent hierarchical namespace of files and directories, for example. As an example, when a new data storage device (not shown) is added to a clustered network system, the storage operating system 212 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

Accordingly, the examples may be embodied as one or more non-transitory computer readable media having machine or processor-executable instructions stored thereon for one or more aspects of the present technology, as described and illustrated by way of the examples herein, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-5, for example.

The network adapter 204 in this example includes the mechanical, electrical and signaling circuitry needed to connect the node computing device 106(1) to one or more of the client devices 108(1)-108(n) over storage network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(2) and/or sent to another node computing device attached via the cluster fabric 104. In some examples, a storage driver 214 in the memory 202 interfaces with the storage adapter to facilitate interactions with the data storage devices 110(1)-110(n), as described and illustrated in more detail later with reference to FIG. 5.

Figure 3:
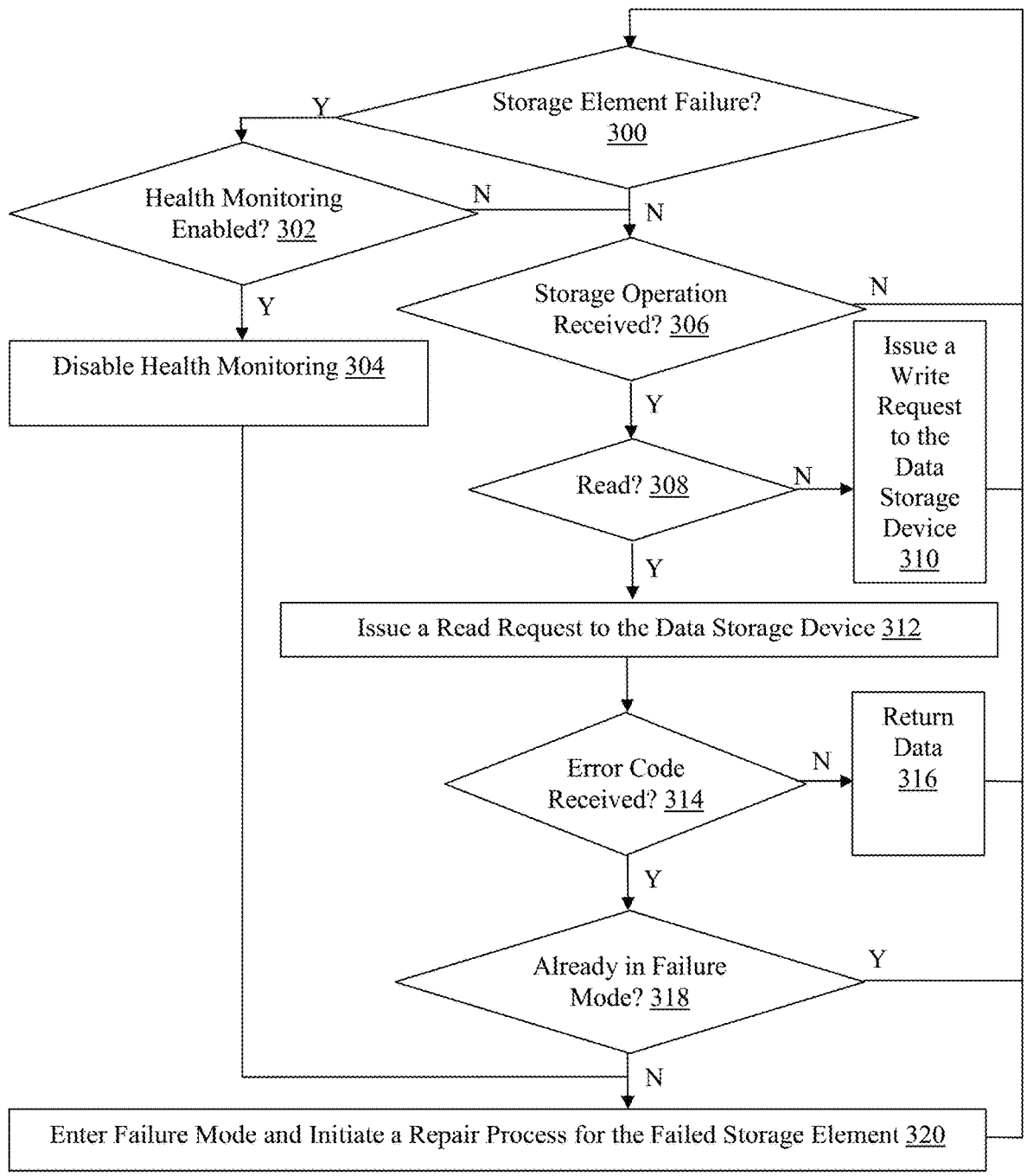
FIG. 3 is a flowchart of an exemplary method for determining when to enter a failure mode in order to initiate a repair process for a failed storage element.

Referring to FIG. 3, an exemplary method for determining when to enter a failure mode in order to initiate a repair process for a failed storage element is illustrated. In step 300 in this example, the node computing device 106(1) determines whether there has been a storage element failure in the data storage device 110(1) based on a message received from the data storage device 110(1) as a result of a routine or periodic scan. In this example, the data storage device 110(1) is an SSD and the storage element is a die, but this technology can be utilized in other environments with other types of data storage devices and/or storage elements.

The data storage device 110(1) can be configured to scan the associated storage elements according to a self-monitoring, analysis, and reporting technology (SMART) monitoring system, for example, to determine whether there has been or is likely to be a failure. If the SMART monitoring system determines that there has been or is likely to be a failure, a reporting or notification message (e.g., a failure prediction message) can be initiated to the node computing device 106(1). Other types of failure reporting from the data storage device 110(1) can also be used in other examples. If the node computing device 106(1) determines that the data storage device 110(1) has reported a storage element failure, then the Yes branch is taken to step 302.

In step 302, the node computing device 106(1) optionally determines whether a health monitoring system of the data storage device 110(1) is currently enabled. If the node computing device 106(1) has previously received a report from the data storage device 110(1) of a storage element failure, then the health monitoring system will have already been disabled. However, in a first iteration, the health monitoring system will be enabled and the Yes branch will therefore be taken to step 304.

In step 304, the node computing device 106(1) disables the health monitoring system. In one example, the health monitoring system is configured to fail the data storage device 110(1) for reporting a number of read errors that exceed an established threshold. Accordingly, by disabling the health monitoring system, the data storage device 110(1) will not be considered to have failed based on a storage element failure that may subsequently cause a number of read errors. However, if the node computing device 106(1) determines in step 302 that the health monitoring system is not currently enabled, or in step 300 that the data storage device 110(1) has not reported a storage element failure, then a respective No branch is taken to step 306.

In step 306, the node computing device 106(1) determines whether a storage operation (e.g., a read or write) is received, such as from client device 108(1) for example. If the node computing device 106(1) determines that a storage operation has not been received, then the No branch is taken back to step 300 and the node computing device 106(1) effectively waits for receipt of an indication of a storage element failure or a storage operation. However, if the node computing device 106(1) determines in step 306 that a storage operation has been received, then the Yes branch is taken to step 308.

In step 308, the node computing device 106(1) determines whether the storage operation is a read storage operation, such as a request to retrieve data stored on the data storage device 110(1), for example. If the node computing device 106(1) determines that the storage operation is not a read storage operation, then the storage operation is a write storage operation and the No branch is taken to step 310.

In step 310, the node computing device 106(1) issues a write request to the data storage device 110(1) based on information included in the write storage operation. In some examples, the write storage operation includes a logical block address which, subsequent to the write, will map to an operational storage element even if the logical block address previously mapped to the failed storage element. Accordingly, a write operation effectively repairs or remaps a logical block address if received while a repair process is being performed, as described and illustrated in more detail later.

Referring back to step 308, if the node computing device 106(1) determines that the received storage operation is a read storage operation, then the Yes branch is taken to step 312. In step 312, the node computing device 106(1) issues a read request to the data storage device 110(1) in order to retrieve the data requested by the client device 108(1), for example.

In step 314, the node computing device 106(1) determines whether an error code has been received. In some examples, the data storage device 110(1) can be preconfigured to return a unique error code when a logical block address corresponding to the received read storage operation maps to a failed storage element. Accordingly, the node computing device 106(1) can determine that a storage element has failed based on a reporting message received from the data storage device 110(1) as a result of a scan, as described and illustrated in more detail earlier with reference to step 300, or based on an error code received following a read request issued to the data storage device 110(1). Other methods for determining that a storage element of the data storage device 110(1) has failed can also be used in other examples.

Accordingly, if the node computing device 106(1) determines in step 314 that an error code has not been received, then the No branch is taken to step 316. In step 316, the node computing device 106(1) returns the requested data in response to the read storage operation, such as to the client device 108(1), for example. The requested data can be retrieved based on a logical block address included in the storage operation that is mapped to an operational storage element of the data storage device 110(1), for example. However, if the node computing device 106(1) determines in step 314 that an error code is received from the data storage device 110(1), indicating that the logical block address included in the read storage operation maps to a failed storage element, then the Yes branch is taken to step 318.

In step 318, the node computing device 106(1) determines whether it is already in a failure mode. The node computing device 106(1) could have entered a failure mode in response to an error code previously received from the data storage device 110(1) in a prior iteration of step 314 or in response to receiving a reporting message regarding a storage element failure from the data storage device 110(1) in step 300. Accordingly, if the node computing device 106(1) determines that it is already in a failure mode, then the Yes branch is taken back to step 300. Optionally, the node computing device 106(1) can regenerate and write the data associated with the logical block address, as described and illustrated in more detail later. However, if the node computing device 106(1) determines that it is not currently in a failure mode and the No branch is taken from step 318, or subsequent to disabling the health monitoring system in step 304, the node computing device 106(1) proceeds to step 320.

In step 320, the node computing device 106(1) enters a failure mode and initiates a repair process for the failed storage element of the data storage device 110(1). Accordingly, if the node computing device 106(1) disabled the health monitoring system in step 304, then a reporting message indicating that a storage element has failed was received from the data storage device 110(1) for the first time in the current iteration, and the node computing device 106(1) enters the failure mode in step 320.

Additionally, if the node computing device 106(1) received an error code from the data storage device 110(1) in response to a read request issued to the data storage device 110(1), and the node computing device 106(1) is not already in a failure mode, then the error code was received for the first time in the current iteration and the node computing device 106(1) enters the failure mode in step 320. The repair process performed by the node computing device 106(1) when in the failure mode is described and illustrated in more detail with reference to FIGS. 4-5. Subsequent to entering the failure mode and initiating the repair process for the failed storage element, the node computing device 106(1) proceeds back to step 300 and can continue to receive and process storage operations associated with the data storage device 110(1) with the failed storage element.

Figure 4:
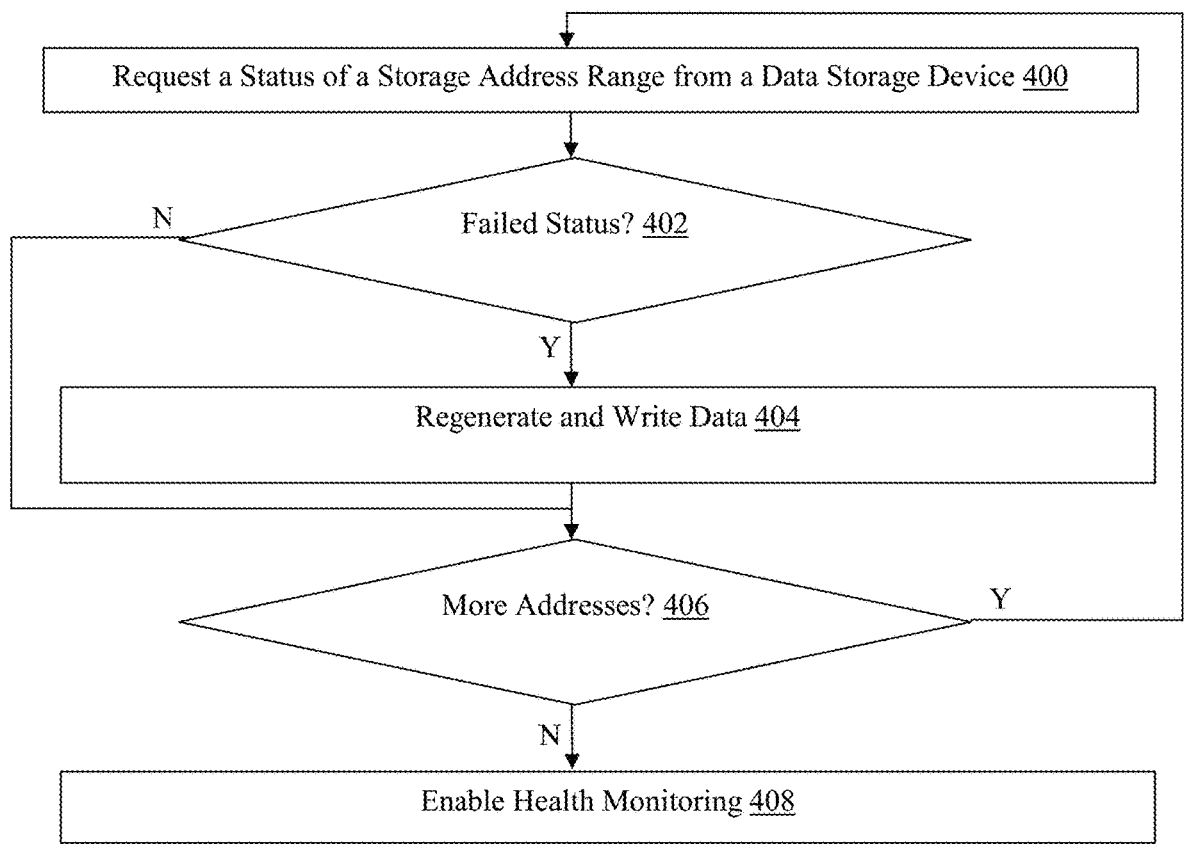
FIG. 4 is a flowchart of an exemplary method for performing a repair process for a failed storage element.

Referring to FIG. 4, an exemplary method for performing a repair process for a failed storage element is illustrated. In step 400 in this example, the node computing device 106(1) requests a status of a storage address range from the data storage device 110(1). In this example, the data stored device 110(1) stores information in the form of blocks, the storage addresses in the storage address range are logical block addresses, and the issued request is a get logical block address status command, although other types of storage, addresses, and requests can also be used in other examples.

The logical block addresses map to physical addresses that are located on storage elements of the data storage device 110(1). In order to determine which logical block addresses map to the failed storage element, the node computing device 106(1) requests the status of a particular range of logical block addresses (e.g., a start and length) from the data storage device 110(1), which is configured to scan the logical block address range and report any logical block addresses that are mapped to the failed storage element.

The node computing device 106(1) must identify the logical block addresses that are mapped to the failed storage element in order to be able to regenerate the data associated with those addresses, as described and illustrated in more detail later with reference to step 404. In this particular example, there are a relatively large number of logical block addresses and the status of a storage address range is requested in step 400 in order to facilitate parallel identification of logical block addresses that are mapped to the failed storage element and regeneration of associated data, although other types of requests could also be communicated to the data storage device 110(1) in step 400 in other examples.

In step 402, the node computing device 106(1) determines whether a failed status is received from the data storage device 110(1) in response to the request for a status of the storage address range issued in step 400. The failed status can be received for any number of logical block addresses within the storage address range in this example. Accordingly, the data storage device 110(1) is configured to report any logical block addresses mapped to the failed storage element that is in the scanned storage address range identified in the request. If the node computing device 106(1) determines that a failed status was received for at least one logical block address, then the Yes branch is taken to step 404.

In step 404, the node computing device 106(1) regenerates and rewrites data associated with the logical block addresses for which a failed status was received in step 402. In this example, the data is regenerated according to a data loss protection and recovery scheme, such as a redundant array of independent disks (RAID) parity or replication scheme, for example, although the data can be regenerated in other ways. Once regenerated, the data is written (e.g., using a standard write request or command) such that the logical block address(es) associated with the data are mapped to operational storage elements of the data storage device 110(1) instead of the failed storage element.

If a write storage operation is received for a logical block address mapped to the failed storage element subsequent to entering the failure mode but prior to the data storage device 110(1) reporting the failed status for the logical block address, the data storage device 110(1) will not subsequently report the failed status for the logical block address as a result of a scan of the associated storage address range in step 402. Instead, the logical block address will be remapped to an operational storage element following the issuance of the write request to the data storage device 110(1). Additionally, the node computing device 106(1) can optionally regenerate and write, to an operational storage element, the data corresponding to a logical block address of a read request that resulted in an error code in step 314 of FIG. 3 instead of waiting to receive a failed status for the logical block address in step 402 of FIG. 4 subsequent to initiating the repair process. Optionally, the remapping or repair to an operationally storage element can utilize over-provisioned or spare capacity of the data storage device 110(1).

Accordingly, this technology facilitates repair of the data storage device 110(1) without failing the data storage device 110(1). In particular, only a subset of the data associated with the data storage device 110(1) (i.e., the data stored on the failed storage element) is regenerated, thereby utilizing significantly fewer resources and advantageously allowing the data storage device 110(1) to remain operational during, and subsequent to, the repair process. Subsequent to regenerating and writing the data in step 404, or if the node computing device 106(1) determines in step 402 that a failed status was not received for any logical block addresses in the scanned storage address range and the No branch is taken, then the node computing device 106(1) proceeds to step 406.

In step 406, the node computing device 106(1) determines whether there are more logical block addresses based on a stored maximum logical block address associated with the data storage device 110(1). If the node computing device 106(1) determines there are more logical block addresses, then the Yes branch is taken back to step 400. Accordingly, the node computing device 106(1) effectively requests the status of each logical block address associated with the data storage device 110(1) in order to identify those logical block addresses that are mapped to the failed storage element. In some examples, one or more of steps 400-406 can occur in parallel. For example, failed statuses can be received for some logical block address(es) in parallel with data being regenerated and/or written for other logical block address(es).

However, if the node computing device determines in step 406 that there are no more addresses, then data storage device 110(1) has been effectively repaired and the No branch is taken to step 408. In step 408, the node computing device 106(1) optionally enables the health monitoring system, which was disabled as described and illustrated in more detail earlier with reference to step 304 of FIG. 3, in order to allow the health monitoring system to continue to monitor the data storage device 110(1) and, if necessary, fail the data storage device 110(1) for a reason other than may be associated with a failed storage element.

Figure 5:
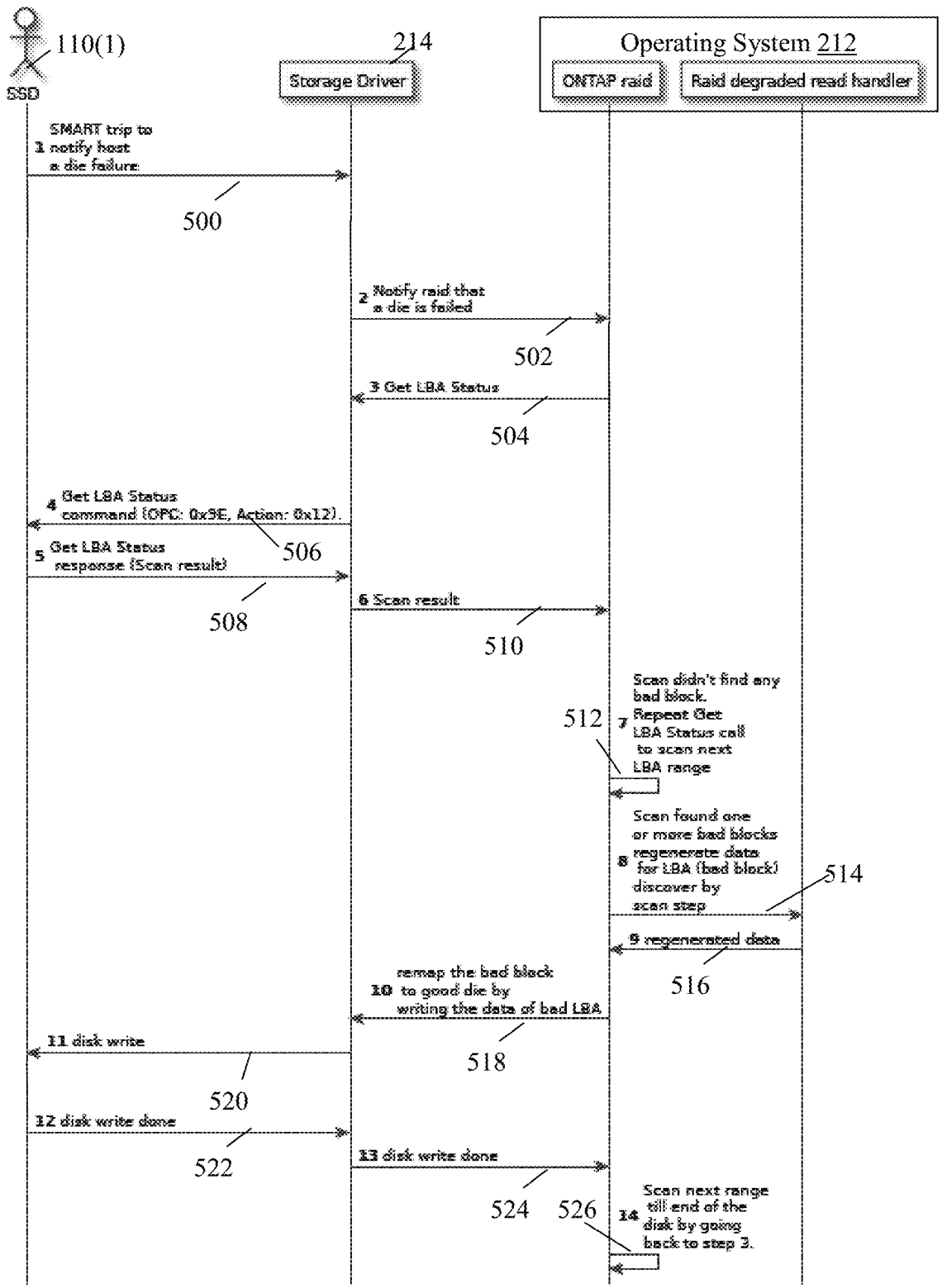
FIG. 5 is a timing diagram of an exemplary method for handling storage element failures to reduce storage device failure rates.

Referring to FIG. 5, a timing diagram of an exemplary method for handling storage element failures to reduce storage device failure rates is illustrated. In step 500 in this example, the data storage device 110(1), which in this example is an SSD, issues a SMART trip or reporting message to notify the host or node computing device 106(1) of a failure of a storage element, which in this example is a die of the SSD. The reporting message is sent to the storage driver 214 executing on the node computing device 106(1) in this example.

In step 502, the storage driver 214 notifies the operating system 212 that a storage element of the data storage device 110(1) has failed. In this particular example, a RAID module of the operating system receives the notification, although the notification can be sent to other portions of the operating system 212 in other examples.

In step 504, the operating system 212 sends a get logical block address (LBA) status command to the storage driver, which is communicated, in step 506, to the data storage device 110(1) by the storage driver 214. The get LBA status command can identify a range of LBAs for which the operating system 212 is requesting the status with respect to whether the LBAs within the range map to failed or operational storage elements of the data storage device 110(1).

In step 508, the data storage device 110(1) performs the scan of the LBAs within the specified range and generates a response or scan result, which is communicates to the storage driver 214. The scan result in this example includes any failure status for any LBAs within the specified range, indicating that the LBAs are mapped to the failed storage element. In step 510, the scan result is forwarded from the storage driver 214 to the operating system 212.

In step 512, the operating system 212 determines whether the scan found any bad blocks based on whether the scan result includes any failed status for any LBAs indicating that the LBAs are mapped to the failed storage element. If the operating system 212 determines that the scan did not find any bad blocks, then the operating system issues a get LBA status command for a next LBA range, and steps 504-510 are repeated.

However, if the operating system 212 determines that the scan did find at least one bad block, then the operating system 212 regenerates data for the bad block based on the associated LBA in steps 514 and 516, optionally utilizing a RAID degraded read handler of the operating system 212. In another example, in which the failed storage element is not protected by parity RAID (e.g., if a spare disk is used to provide data protection), zeroes may be written instead of regenerating the data.

In step 518, the operating system 212 remaps the LBA corresponding to the bad block by writing the regenerated data to a good or currently operational storage element or die. Accordingly, the write request is sent by the operating system 212 to the storage driver 214, which, in step 520, issues a write request or command to the data storage device 110(1).

In step 522, the data storage device 110(1) sends an indication that the write request has been successfully completed to the storage driver 214, which, in step 524, forwards the indication to the operating system 212. In step 526, the operating system 212 determines whether all of the LBAs corresponding to the data storage device 110(1) have been scanned. If the operating system 212 determines that all of the LBAs have been scanned, then the process ends and, otherwise, the operating system 212 initiates a scan of a next range of LBAs by repeating steps 504-510.

With this technology, data storage devices (e.g., SSDs) with a failed storage element (e.g., die) can be repaired using RAID techniques, for example, without requiring replacement and while continuing to service storage operations. Accordingly, replacement cost for data storage devices can be significantly reduced with this technology. Additionally, performance degradation resulting from failed data storage devices and associated data recovery can also advantageously be reduced.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
regenerating, by a computing device, data corresponding to a first logical address mapped to a storage element of a solid state drive (SSD) after determining the storage element has failed, wherein the first logical address is within a first logical address range;
writing, by the computing device, the regenerated data to one or more physical locations on one or more operational storage elements of the SSD in order to remap the first logical address to the physical locations;
issuing, by the computing device, a request to the SSD for a status of a second logical address range; and
determining, by the computing device, when a failed status for a second logical address is reported in response to the request, wherein the second logical address range includes the second logical address and is different than the first logical address range, and the determination is made in parallel with the regenerating of at least a portion of the data.

2. The method of claim 1, wherein the SSD utilizes block-based storage and the method further comprises receiving, by the computing device, one or more status results from the SSD in response to one or more requests to scan one or more logical block address (LBA) ranges to identify one or more LBAs mapped to the failed storage element.

3. The method of claim 1, further comprising determining, by the computing device, that the storage element has failed based on a failure prediction message received from the SSD.

4. The method of claim 1, further comprising determining, by the computing device, that the storage element has failed based on an error code received in response to a read storage operation issued to the SSD, wherein the first logical address is associated with the read storage operation.

5. The method of claim 1, further comprising servicing, by the computing device, one or more received storage operations for other data using one or more of the operational storage elements in parallel with regenerating at least another portion of the data.

6. The method of claim 1, wherein the failed storage element comprises a die of the SSD.

7. A non-transitory machine readable medium having stored thereon instructions for handling storage element failures to reduce storage device failure rates comprising machine executable code which when executed by at least one machine causes the machine to:
    regenerate data corresponding to a first logical address mapped to a storage element of a solid state drive (SSD) after determining the storage element has failed, wherein the first logical address is within a first logical address range;
    write the regenerated data to one or more physical locations on one or more operational storage elements of the SSD in order to remap the first logical address to the physical locations;
    issue a request to the SSD for a status of a second logical address range; and
    determine when a failed status for a second logical address is reported in response to the request, wherein the second logical address range includes the second logical address and is different than the first logical address range, and the determination is made in parallel with the regenerating of at least a portion of the data.

8. The non-transitory machine readable medium of claim 7, wherein the SSD utilizes block-based storage and the machine executable code when executed by the machine further causes the machine to receive one or more status results from the SSD in response to one or more requests to scan one or more logical block address (LBA) ranges to identify one or more LBAs mapped to the failed storage element.

9. The non-transitory machine readable medium of claim 7, wherein the machine executable code when executed by the machine further causes the machine to determine that the storage element has failed based on a failure prediction message received from the SSD.

10. The non-transitory machine readable medium of claim 7, wherein the machine executable code when executed by the machine further causes the machine to determine that the storage element has failed based on an error code received in response to a read storage operation issued to the SSD, wherein the first logical address is associated with the read storage operation.

11. The non-transitory machine readable medium of claim 7, wherein the machine executable code when executed by the machine further causes the machine to service one or more received storage operations for other data using one or more of the operational storage elements in parallel with regenerating at least another portion of the data.

12. The non-transitory machine readable medium of claim 7, wherein the failed storage element comprises a die of the SSD.

13. A computing device, comprising:
    a memory containing machine readable medium comprising machine executable code having stored thereon instructions for handling storage element failures to reduce storage device failure rates; and
    a processor coupled to the memory, the processor configured to execute the machine executable code to cause the processor to:
        regenerate data corresponding to a first logical address mapped to a storage element of a solid state drive (SSD) after determining the storage element has failed, wherein the first logical address is within a first logical address range;
        write the regenerated data to one or more physical locations on one or more operational storage elements of the SSD in order to remap the first logical address to the physical locations;
        issue a request to the SSD for a status of a second logical address range; and
        determine when a failed status for a second logical address is reported in response to the request, wherein the second logical address range includes the second logical address and is different than the first logical address range, and the determination is made in parallel with the regenerating of at least a portion of the data.

14. The computing device of claim 13, wherein the SSD utilizes block-based storage and the processor is further configured to execute the machine executable code to further cause the processor to receive one or more status results from the SSD in response to one or more requests to scan one or more logical block address (LBA) ranges to identify one or more LBAs mapped to the failed storage element.

15. The computing device of claim 13, wherein the processor is further configured to execute the machine executable code to further cause the processor to determine that the storage element has failed based on a failure prediction message received from the SSD.

16. The computing device of claim 13, wherein the processor is further configured to execute the machine executable code to further cause the processor to determine that the storage element has failed based on an error code received in response to a read storage operation issued to the SSD, wherein the first logical address is associated with the read storage operation.

17. The computing device of claim 13, wherein the processor is further configured to execute the machine executable code to further cause the processor to service one or more received storage operations for other data using one or more of the operational storage elements in parallel with regenerating at least another portion of the data.

18. The computing device of claim 13, wherein the failed storage element comprises a die of the SSD.

* * * * *